(12) United States Patent
Weissenmayer et al.

(10) Patent No.: US 11,402,502 B2
(45) Date of Patent: Aug. 2, 2022

(54) METHOD AND CONTROL UNIT FOR DETERMINING PRECIPITATION INTENSITY WITH THE AID OF ULTRASONIC MEASURED DATA

(71) Applicant: Robert Bosch GmbH, Stuttgart (DE)

(72) Inventors: Simon Weissenmayer, Flein (DE); Michael Schumann, Stuttgart (DE); Timo Koenig, Unterheinriet (DE)

(73) Assignee: Robert Bosch GmbH, Stuttgart (DE)

( * ) Notice: Subject to any disclaimer, the term of this patent is extended or adjusted under 35 U.S.C. 154(b) by 339 days.

(21) Appl. No.: 16/650,676

(22) PCT Filed: Oct. 4, 2018

(86) PCT No.: PCT/EP2018/076989
§ 371 (c)(1),
(2) Date: Mar. 25, 2020

(87) PCT Pub. No.: WO2019/091671
PCT Pub. Date: May 16, 2019

(65) Prior Publication Data
US 2021/0208274 A1  Jul. 8, 2021

(30) Foreign Application Priority Data
Nov. 9, 2017  (DE) .......................... 102017219906.7

(51) Int. Cl.
*G01S 15/88* (2006.01)
*G01S 7/53* (2006.01)
(Continued)

(52) U.S. Cl.
CPC .............. *G01S 15/885* (2013.01); *G01S 7/53* (2013.01); *G01S 7/539* (2013.01); *G01S 15/931* (2013.01)

(58) Field of Classification Search
CPC .......... G01S 15/885; G01S 7/53; G01S 7/539; G01S 15/931; G01S 15/88
(Continued)

(56) References Cited

U.S. PATENT DOCUMENTS

2016/0327687 A1* 11/2016 Nylander ................ G01W 1/14
2021/0208274 A1*  7/2021 Weissenmayer ... G01N 29/4454

FOREIGN PATENT DOCUMENTS

CN    111279186 A  *  6/2020  ........... G01N 29/024
DE    10100732 A1  *  7/2002  ............ B60S 1/0822
(Continued)

OTHER PUBLICATIONS

International Search Report for PCT/EP2018/076989, dated Jan. 18, 2019.

*Primary Examiner* — Daniel Pihulic
(74) *Attorney, Agent, or Firm* — Norton Rose Fulbright US LLP; Gerard Messina (57) ABSTRACT

A method for measuring precipitation. The method includes a read-in step, a detection step and a determination step. In the read-in step, data packets of at least one ultrasonic sensor are read in. Excitations detected by the ultrasonic sensor within a measuring time window are mapped in a data packet. The excitations are mapped as time values and intensity values. The time value represents a detection point in time of an excitation. The intensity value represents an amplitude of the excitation. In the detection step, excitations are detected as drop events. An excitation is detected as a drop event induced by a pulse of an impacting drop if the time value and/or the intensity value of the excitation satisfies at least one characteristic of a drop event. In the determination step, a precipitation intensity is determined, using a number of drop events detected per time unit.

13 Claims, 3 Drawing Sheets

(51) Int. Cl.
*G01S 7/539* (2006.01)
*G01S 15/931* (2020.01)

(58) Field of Classification Search
CPC ... G01N 2291/011; G01N 2291/02845; G01N 2291/101; G01N 2291/106; G01N 29/14; G01N 29/4454; G01N 29/024; G01W 1/14; B60S 1/0855
See application file for complete search history.

(56) References Cited

FOREIGN PATENT DOCUMENTS

| | | | | |
|---|---|---|---|---|
| DE | 102005023696 | A1 | 11/2006 | |
| DE | 102017219906 | A1 * | 5/2019 | ........... G01N 29/024 |
| DE | 102018206741 | A1 * | 11/2019 | .............. B60T 8/172 |
| DE | 102018219223 | A1 * | 5/2020 | |
| DE | 102019220411 | A1 * | 6/2021 | ........... G01N 29/024 |
| EP | 0308990 | A1 | 3/1989 | |
| EP | 0422553 | A1 | 4/1991 | |
| EP | 3071999 | A1 | 9/2016 | |
| JP | S5945247 | A | 3/1984 | |
| JP | S5945248 | A | 3/1984 | |
| JP | S5952763 | A | 3/1984 | |
| JP | 2002277386 | A | 9/2002 | |
| JP | 2014505914 | A | 3/2014 | |
| JP | 2016148582 | A | 8/2016 | |
| WO | WO-2019091671 | A1 * | 5/2019 | ........... G01N 29/024 |

* cited by examiner

METHOD AND CONTROL UNIT FOR DETERMINING PRECIPITATION INTENSITY WITH THE AID OF ULTRASONIC MEASURED DATA

FIELD

The present invention relates to a method for measuring precipitation, in particular at a vehicle, and a control unit for measuring precipitation.

BACKGROUND INFORMATION

Rain may be detected by a rain sensor of a vehicle. The rain sensor detects an intensity of the rain due to different wettings of a windshield of the vehicle. A windshield wiper interval may be influenced by the rain sensor. However, it is not possible to determine an actual rain quantity. A measurement of the rain quantity may take place with the aid of volumetric measuring devices. These measuring devices are generally stationary and part of a meteorological measuring network.

SUMMARY

In accordance with example embodiments of the present invention, an example method for measuring precipitation and an example control unit for measuring precipitation as well as finally a corresponding example computer program product are provided. Advantageous refinements on and improvements of the present invention are described herein.

Specific embodiments of the present invention may advantageously make it possible to quantify precipitation with the aid of an ultrasonic sensor system, in particular ultrasonic sensors of a vehicle. In combination with a position determining system of the vehicle, it is possible to determine where and how much it has rained. This information may be used to predict flooding events and to predict road conditions.

An example method for measuring precipitation is provided in accordance with the present invention, the example method including the following steps:

Reading in data packets of at least one ultrasonic sensor, excitations detected by the ultrasonic sensor within a measuring time window being mapped in a data packet, the excitations being mapped as time values, the time value representing a detection point in time of an excitation;

Detecting excitations as drop events, an excitation being detected as a drop event brought about by a pulse of an impacting drop if the time value of the excitation satisfies at least one characteristic of a drop event; and Determining a precipitation intensity using a number of drop events detected per time unit.

Specific embodiments of the present invention may be viewed, among other things, as being based on the considerations and findings described below.

An ultrasonic sensor may be used as a surroundings sensor of a vehicle. However, the ultrasonic sensor may also be situated in a fixed location as a precipitation sensor. During transmission, a surface of the ultrasonic sensor is made to vibrate by an electrical excitation. The vibration is radiated into the surrounding air as ultrasound. After the transmission, the ultrasonic sensor is ready to receive a measuring time window. The electrical excitation may be converted into the vibration, for example, with the aid of a piezoelectric crystal. The ultrasound is reflected on objects and returned as an echo. When the echo strikes the surface, the surface is again excited to vibrations during reception. The vibrations are mapped in an electrical signal. The vibrations may be mapped in an electrical signal, for example by the piezoelectric crystal. A distance from the object may be ascertained from a propagation time between the emission of the ultrasound and the receipt of the echo. If the echo arrives after the expiry of the measuring time window, the object is outside a detection range of the ultrasonic sensor.

When a drop strikes the surface of the ultrasonic sensor, a pulse of the drop is transferred to the surface. The pulse also excites the surface to a vibration. The surface is excited to a vibration, in particular, close to a natural frequency of the surface. The ultrasonic sensor also records this vibration and maps it in the electrical signal.

Since the ultrasonic sensor is excited to a vibration at the natural frequency or close to the natural frequency during a drop event, the surface vibrates at a high amplitude.

Consequently, the excitation due to the drop is mapped in the electrical signal by a strong signal amplitude. The drop event is detectable by the strong amplitude.

A drop event is detectable if no excitation having a similar time value is mapped within a data packet preceding and/or following the data packet. Each drop is unique and differs only slightly from other drops. Each drop event is therefore different than other drop events and occurs only once. If an excitation having a similar time value is detected over multiple measuring time periods, this excitation represents an echo from an actual object with a high probability and is consequently not evaluated as a drop event.

A drop event may be detected if no excitation having the same time value is represented in different data packets of at least two ultrasonic sensors forming the same measuring time window.

Different ultrasonic sensors may map drop events at different points in time within the same measuring time window. Multiple drop events may also be recorded at an ultrasonic sensor within one measuring time window. If the time values of two excitations are the same at different ultrasonic sensors, one signal source is probably an electromagnetic interference into the ultrasonic sensors, for example due to lightning.

No drop event is detectable if two time values of two excitations in different data packets of two ultrasonic sensors vary by a time period which corresponds to a propagation time of a sound signal between the ultrasonic sensors. In particular, no drop event is detectable if the time values vary by a time period which is less than or equal to the propagation time between the ultrasonic sensors. Two ultrasonic sensors may receive the same sound signal within the same measuring time window. The sound waves reach the first ultrasonic sensor first and then the second ultrasonic sensor. The excitation due to the sound signal may be ignored.

In the reading-in step, intensity values of the excitations may furthermore be read in. The intensity value may represent an amplitude of the excitation. A drop event is detectable if the intensity value satisfies at least one characteristic of a drop event. In an echo, a probability that the echo is indeed an echo from an object may be inferred from the intensity or amplitude.

The drop size may be determined based on the intensity values of drop events and the precipitation quantity calculated thereby.

In the reading-in step, frequency values of the excitations may furthermore be read in. The frequency value may represent a frequency of the excitation. A drop event is detectable if the frequency value satisfies at least one characteristic of a drop event. The sensors code the ultrasonic signals by changing the frequency within one transmission operation in a characteristic manner. Raindrops generally do not create these frequency curves. As a result, an excitation caused by raindrops may be different than an excitation caused by echoes. For example, the ultrasonic sensor may also emit frequency ramps or frequency sweeps. The excitation caused by the drops may then take place at a different frequency than expected due to the emitted frequency. The drop event may also be detected in this way.

The precipitation intensity may furthermore be determined using an impact velocity of the drops causing the drop events. The impact velocity is associated with the pulse of the drop. If the impact velocity is known, a mass of the drop may be inferred. If the number of drops is the same, a larger precipitation quantity falls in the case of larger drops than in the case of smaller drops.

The impact velocity may be determined using a vehicle velocity of a vehicle including the ultrasonic sensor and/or a wind velocity at the ultrasonic sensor. The impact velocity may be determined by a vector addition of the vehicle velocity and the wind velocity. A velocity component transverse to a movement direction of the vehicle may be ignored, since a falling velocity of drops in air is known.

A drop event may furthermore be determined using a reverberation time value of the excitation mapped in the data packet. A reverberation time value characterizes a vibration duration of the ultrasonic sensor after the excitation. A drop event decays together with the system-specific attenuation of the ultrasonic sensor, since the pulse of the drop represents a one-time excitation. An excitation due to a drop decays faster compared to an excitation due to a received echo, since the echo may include multiple sequential ultrasonic pulses.

The drop events may not be evaluated if an object is detected in a spray area in front of the ultrasonic sensor. Drops thrown up by other vehicles or by the host vehicle excite the ultrasonic sensor to vibrate. These excitations would corrupt the determination of the precipitation intensity and may be ignored. Spray water and splashing water from other vehicles would be evaluated as too high a precipitation intensity.

The example method may include a provision step, in which a piece of precipitation information representing the precipitation intensity and a piece of position information associated with the piece of precipitation information are provided for a higher-level information network. The piece of precipitation information may be made available, for example, for a weather service. As a result, precipitation information may be collected from many vehicles and processed. The precipitation intensity may thus be detected over a fairly wide area. Forecasts of weather events may thus be improved.

The example method may be implemented, for example, in software or hardware or in a mixed form of software and hardware, for example in a control unit.

The approach described here also provides an example control unit for measuring precipitation, the control unit being designed to carry out, control or implement the steps of one variant of the method described here.

The example control unit may be an electrical device including at least one processing unit for processing signals or data, at least one memory unit for storing signals or data, and at least one interface and/or one communication interface for reading in or outputting data embedded in a communication protocol. The processing unit may be, for example, a signal processor, a so-called system ASIC or a microcontroller for processing sensor signals and outputting data signals as a function of the sensor signals. The memory unit may be, for example, a flash memory, an EPROM or a magnetic storage unit. The interface may be designed as a sensor interface for reading in the sensor signals from a sensor and/or as an actuator interface for outputting the data signals and/or control signals to an actuator. The communication interface may be designed to read in or output the data wirelessly and/or in a hard-wired manner. The interfaces may also be software modules, which are present, for example, on a microcontroller in addition to other software modules.

A computer program product or computer program, including program code, is also advantageous, which may be stored on a machine-readable carrier or storage medium, such as a semiconductor memory, a hard disk memory, or an optical memory, and is used for carrying out, implementing and/or controlling the steps of the method according to one of the specific embodiments described above, in particular when the program product or program is executed on a computer or a device.

It is pointed out that some of the possible features and advantages of the present invention are described herein as the method and ultrasonic sensor control unit with reference to different specific embodiments. Those skilled in the art recognize that the features may be suitably combined, adapted or exchanged to obtain additional specific embodiments of the present invention.

BRIEF DESCRIPTION OF EXAMPLE EMBODIMENTS

Specific embodiments of the present invention are described below with reference to the figures, neither the figures nor the description are to be interpreted as limiting the present invention.

The figures are only schematic and not true to scale. The same reference numerals designate the same or functionally equivalent features in the figures.

DETAILED DESCRIPTION OF EXAMPLE EMBODIMENTS

The example embodiments described herein may make it possible to predict an aquaplaning risk with the aid of precise precipitation measurement. The prediction makes it possible to increase the availability of autonomous travel.

In a light rain shower, a precipitation quantity between 0.1 mm and 0.4 mm falls in 10 minutes. In a moderate rain shower, a precipitation quantity between 0.4 mm and 2 mm falls in 10 minutes. In a heavy rain shower, a precipitation quantity between 2 mm and 8 mm falls in 10 minutes. In a very heavy rain shower, a precipitation quantity of more than 8 mm falls in 10 minutes.

In light rain, a precipitation quantity between 0.1 mm and 0.5 mm falls in one hour. In moderate rain, a precipitation quantity between 0.5 mm and 4 mm falls in one hour. In heavy rain, a precipitation quantity between 4 mm and 10 mm falls in one hour.

Weather stations at a distance of multiple kilometers may measure the amounts of precipitation. The measurement generally takes place by integrating a rain quantity over a longer period of time.

Rain sensors may be used to control the windshield wiper activity. If a rain sensor which controls the wiper actuation according to the water quantity on the window is attached to the inside of the windshield, an LED (light-emitting diode) emits infrared light. If the window is dry, this light is almost completely reflected, so that the photodiode receives a large amount of light. The more water there is on the window, the smaller is the light reflection. The wipers work faster. Integrated light sensors automatically switch on the headlights as darkness increases and upon entering a tunnel.

The difference from a true precipitation meter is that the precise precipitation quantity is not measured, but rather only secondary effects are recorded, such as the wetting or the visual impairment of a rained-upon window.

In heavy rain, the rain sensor measures a very slight light reflection and allows the wipers to work at maximum speed. However, a great many drops side by side merge with each other on the sensor surface and cause more, rather than less, light to be reflected. As a result, the actual rain quantity is detectable only on a limited basis with the aid of the conventional sensors. A quantitative measurement of the precipitation quantity is no longer possible in heavy rain.

Raindrops may interfere with the distance measurement using ultrasonic systems, since they cause, in part, extremely intensive ultrasonic noise when they strike the sensor surface. The impact of the drop excites the sensor to vibrate at its natural frequency. The natural frequency of the sensor is selected in such a way that it corresponds to the operating frequency of the sensor. A high sensitivity of the sensor to impacting raindrops therefore results. If the vehicle is at a standstill, or at low moving velocities and in normal rain, very few influences are measurable. In a drizzle or spray, in particular, the energy of the drops appears to be insufficient to excite the sensor. At higher velocities and in light rain, however, this is the case, albeit only in the case of the front sensors in the direction of travel. A lot of development work has been performed to be able to carry out the distance measurement even in heavy rain, in particular when the vehicle is moving at higher velocity and the drops therefore strike the sensor surface particularly rapidly.

Figure 1:
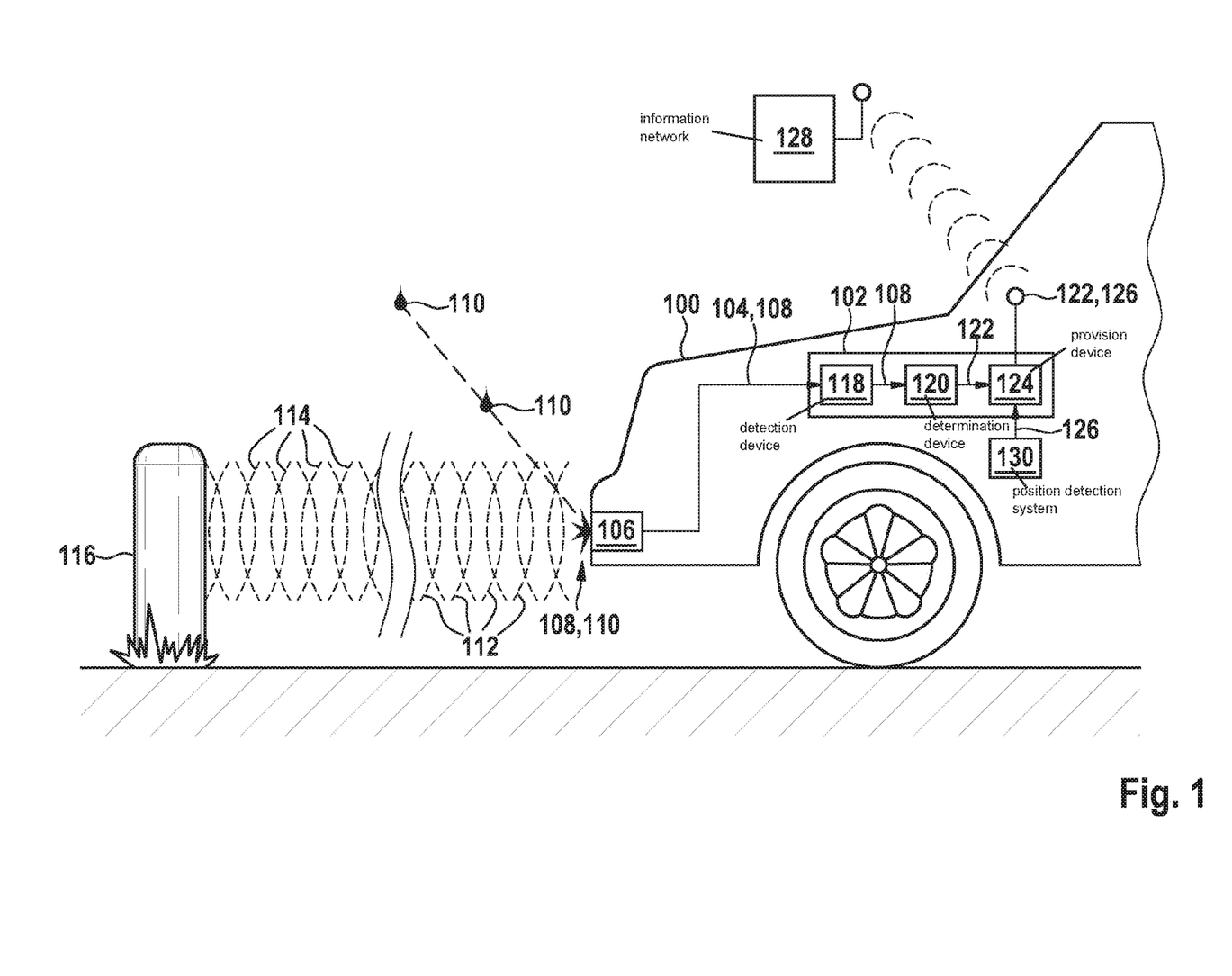
FIG. 1 shows a representation of a vehicle, including a control unit, according to one exemplary embodiment.

FIG. 1 shows a representation of a vehicle 100, including a control unit 102 according to one exemplary embodiment. Control unit 102 evaluates data packets 104 from ultrasonic sensors 106 of vehicle 100. Control unit 102 receives data packets 104 via a data line of vehicle 100. Control unit 102 is designed to determine a precipitation intensity using drop events 108 mapped in data packets 104.

A drop event 108 represents a pulse of a drop 110 striking ultrasonic sensor 106. Upon impact, drop 110 transmits its pulse to ultrasonic sensor 106 and excites the latter to a vibration at its natural frequency. A point in time of the excitation and an intensity of the excitation are mapped in an electrical signal. The excitation does not differ from a vibration, which is induced by a received echo 112 of a previously emitted ultrasonic signal 114.

All excitations whose points in time of the excitation are within a measuring time window after the emission of ultrasonic signal 114 and whose intensities are greater than a threshold value are mapped in a data packet 104. At least one time value representing the point in time is mapped in data packet 104 for each excitation. A new measuring time window begins upon the emission of next ultrasonic signal 114. Excitations detected in the new measuring window are mapped in a new data packet 104.

In an actual echo 112, the point in time of the excitation forms a propagation time between the transmission of ultrasonic signal 114 and the arrival of echo 112. The propagation time is proportional to a distance between ultrasonic sensor 106 and an object 116 reflecting ultrasonic signal 114.

In a drop event 108, the point in time of the excitation forms only at the point in time at which drop 110 has struck ultrasonic sensor 106.

An intensity value representing the intensity may also be mapped in a data packet for each excitation. In an actual echo 112, the intensity of the excitation is proportional to the distance, since ultrasonic signal 114 and echo 112 weaken as the distance increases. In addition, the intensity of a genuine echo 112 is dependent on a surface condition of object 116 and an orientation of object 116.

The intensity maps the pulse, and thus an impact energy of drop 110, in a drop event 108. The pulse is dependent on a mass of drop 110 and an impact velocity of drop 110. The mass represents a size of drop 110. The impact velocity is dependent on a horizontal velocity of drop 110 in the air and a velocity of vehicle 100.

The impact velocity of drop 110 corresponds to a velocity of an airstream at vehicle 100. The airstream may be detected with the aid of a dynamic pressure in front of vehicle 100. For example, the airstream may be detected with the aid of a rotational speed of a blown fan wheel of vehicle 100. The impact velocity may thus be computationally compensated for from the pulse. The intensity of the excitation is therefore dependent on the drop size.

Control unit 102 includes a detection device 118 and a determination device 120. In detection device 118, drop events 108 are filtered out of the excitations mapped in data packets 104. For this purpose, the excitations are checked for characteristics of drop events 108. In determination device 120, drop events 108 are counted, and a drop rate or a number of drop units per time unit is formed. A precipitation intensity is higher, the greater the number of drop events 108 is counted per time unit. Determination device 120 maps the precipitation intensity in a piece of precipitation information 122.

If an excitation of ultrasonic sensor 106 is induced by an echo 112 reflected from object 116, excitations having similar intensities and points in time result in multiple consecutive measuring time windows. The measuring time window is, for example, 70 milliseconds long. The point in time of the excitation does not change much over multiple measuring time windows even at a high relative velocity between vehicle 100 and object 116. Excitations at similar points in time and/or having similar intensities over multiple measuring windows are not detected as drop events 108.

Excitations due to drops 110 are statistically distributed and do not follow a pattern. In at least one preceding measuring time window and at least one subsequent measuring time window, no excitation is recorded at a similar point in time as would be in the measuring time window in the case of a genuine drop event 108.

In addition, one drop 110 strikes only an ultrasonic sensor 106. Simultaneous excitations may be induced by two simultaneously striking drops 110 only with a very slight probability. Simultaneous excitations of multiple ultrasonic sensors are not detected as drop events 108.

Excitations at adjacent ultrasonic sensors 106, which are recorded maximally with the aid of a time offset corresponding to a propagation time of an acoustic signal between the ultrasonic sensors, are also not detected as drop events 108.

In one exemplary embodiment, the drop events are counted taking into account the drop size. The intensity values of drop events 108 are also taken into account. The impact velocity of drop 110 may be calculated from the intensity value to obtain the drop size. The precipitation quantity may be detected thereby with a high degree of accuracy.

In one exemplary embodiment, control unit 102 also includes a provision device 124, via which precipitation information 122 and position information 126 associated with precipitation information 122 are provided for a higher-level information network 128. Precipitation information 122 and position information 126 are transmitted wirelessly. Position information 126 is read in by a position detection system 130 of vehicle 100.

To calculate a risk of flooded roads, vehicle 100 transmits the precipitation quantity, together with the GPS position, to a cloud. The risk of a flooding is highly dependent on the road and the surroundings. With the aid of the ultrasonic sensors, the vehicle may also detect how high the water is on the road and likewise transmits this information to the cloud. As a result, the cloud may learn which precipitation quantity results in which water level and in flooding on which road section and over which period of time.

EMC and background noises from the surroundings may result in similar measurement results as raindrops. To differentiate these noises from raindrops, not only the signals of the forward-oriented sensors are evaluated. Since the noises are generally not limited exclusively to one of the front sensors but to multiple sensors at the same time and may also affect the rear sensors, control unit 102 may identify the noises by incorporating all sensors. Signals which are detectable by multiple adjacent sensors at the same time are not interpreted as raindrops. In surroundings having a high noise level, this may additionally be calculated by averaging the signals of the rear sensors, if it is possible to rule out the fact that rain is carried to the rear sensors by tailwind by measuring the wind velocity. To calculate the actual precipitation quantity, the noise level is subtracted from the measured values of the front sensors.

The sensors furthermore have a natural measurement noise, which also results in the corrupted detection of objects (false positives or FP objects). The sensors are designed in such a way that 20% of the FP objects are theoretically attributable to the measurement noise. Due to this design, it is ensured that very weak echoes 112 are also detectable by the sensor, may be forwarded to control unit 102 and may be evaluated thereby. At low velocities, small raindrops result in an object pattern which closely resembles that of the measurement noise, while an increased precipitation is detectable by an increase in intensity. The number of incorrectly detected objects due to measurement noise may individually become stronger or weaker over time for each sensor and may also be dependent on ambient conditions such as temperature. However, if the number of these objects suddenly increases significantly at all four sensors, even though the ambient conditions have not significantly changed, this increase may indeed be attributed to an increased precipitation. If the number of FP objects significantly exceeds 20%, this exceedance may indeed be attributed to the precipitation. In addition, the number and detection probability of the objects attributable to the measurement noise is independent of the vehicle velocity, while the number and detection probability of the objects attributable to the raindrops increase as the impact velocity rises. FP objects due to precipitation may thus be particularly effectively differentiated from FP objects due to measurement noise at a frequently varying vehicle velocity.

Wind noises and wet conditions may increase the noise at the sensors and thereby also cause the number of FP objects to rise above 20%. It is therefore favorable to compensate for the number of expected FP objects with the aid of the calculated noise level, i.e. to subtract the number of expected FP objects due to noise from the number of measured FP objects for determining the number of raindrops.

Whenever an "object" has been detected only once within a measuring window, while the object was not detected in the preceding and in the following measuring window, a raindrop may be presumed. However, if the object was detected simultaneously by adjacent sensors, this may indicate an EMC background noise. Whenever the object is detected by adjacent sensors at approximately the same time, this may indicate a background noise. The maximum time difference may be calculated with the aid of the sensor distance of, for example, 0.343 m and the sound velocity of, for example, 343 m/s to 1 ms. The signaled distance information of the sensor may be discarded upon detecting a raindrop, since the excitation of the sensor did not take place by receiving an echo 112. To be able to particularly accurately calculate the size and impact velocity, the sensor may signal the absolute value of the excitation to control unit 102. Alternatively, the sensor may also transmit the calculated average value to control unit 102 so that control unit 102 may calculate the absolute value of the excitation together with the detection probability.

Figure 2:
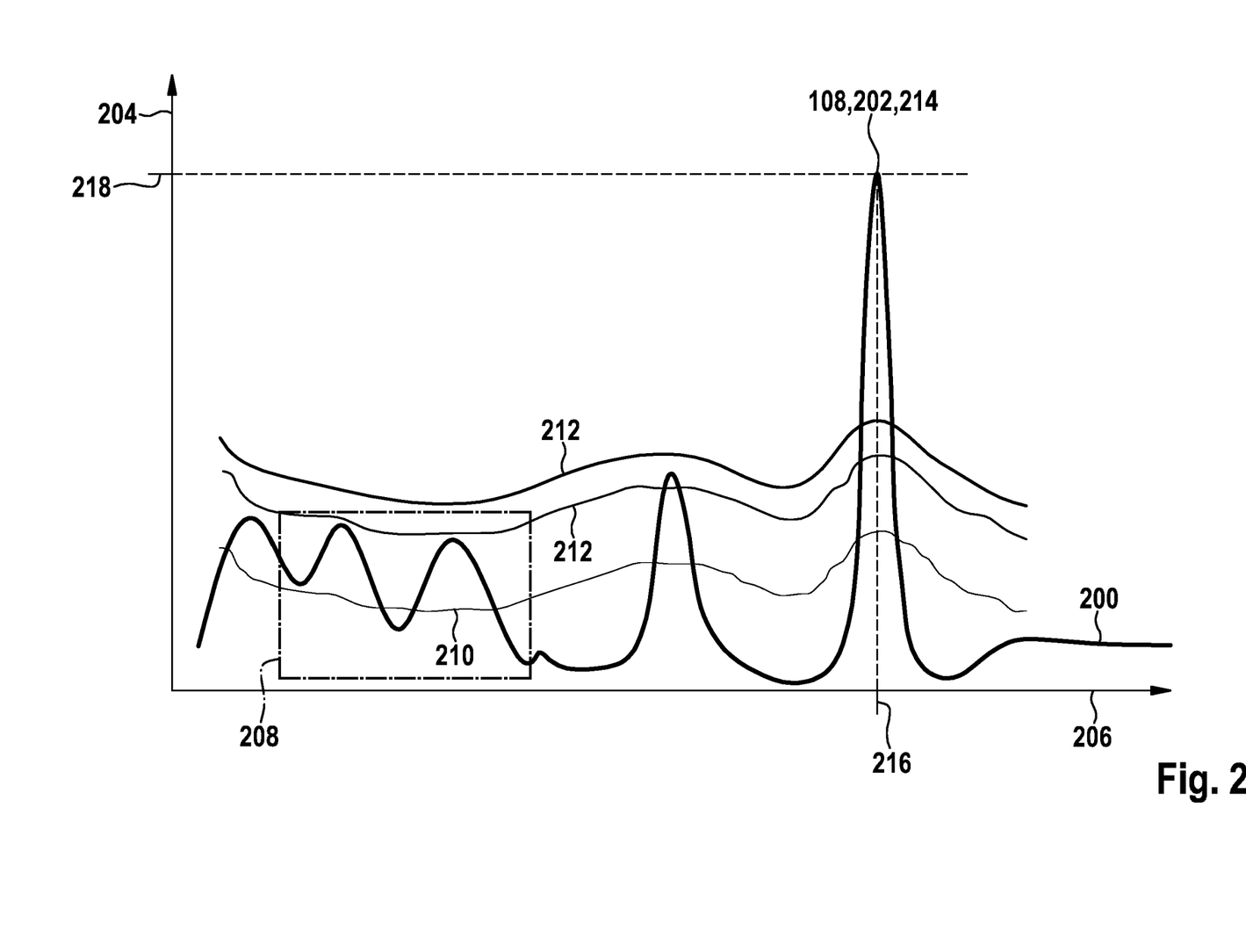
FIG. 2 shows a representation of a signal of an ultrasonic sensor, including an excitation by a drop event.

FIG. 2 shows a representation of a signal 200 of an ultrasonic sensor, including an excitation 202 by a drop event 108. Signal 200 maps an intensity 204 of vibrations of the ultrasonic sensor over a measuring time period 206. The ultrasonic sensor corresponds, for example, to an ultrasonic sensor illustrated in FIG. 1. Measuring time period 206 begins upon the emission of an ultrasonic signal, which is not illustrated here, by the ultrasonic sensor. The ultrasonic sensor is excited to vibrations by impacting sound waves. The ultrasonic sensor is also excited to vibrations by an ambient noise 208. Vibrations due to ambient noise 208 may be distinguished from vibrations due to echoes of the ultrasonic signal only by their intensity 204.

All vibrations of the ultrasonic sensor are mapped in the signal. The vibration induced by the pulse transmission upon the impact of the drop during drop event 108 is also mapped in signal 200 as a received sound.

To be able to distinguish excitations 202 due to real echoes and drop events 108 from ambient noise 208, a moving average 210 of intensities 204 is formed in the ultrasonic sensor. Moving average 210 is shifted, for example, by an absolute amount and/or factor in the direction of higher intensities 204 and yields an adaptive limiting value 212. Excitations having higher intensities 204 than limiting value 212 are mapped as a data set 214 in the data packet associated with this measuring time period 206. Data set 214 includes at least one time value 216 representing the point in time of excitation 202 and one intensity value 218 representing maximum intensity 204 of excitation 202.

Data set 214 may also include the value of limiting value 212 at time value 216 and/or mean value 210 and/or a time period of excitation 202. Limiting value 212 or mean value 210 may be referred to as the noise level.

An ultrasonic system calculates the sound intensity, for example via a measuring window of 70 milliseconds. For each millisecond, it calculates a mean value of preceding and subsequent intensities (moving average). If the sound intensity of the millisecond under consideration is higher than the mean value by a small threshold value, the sensor signals an object having a low probability to the control unit (adaptive threshold). If the sound intensity is also higher than the mean value by a large threshold value, the sensor instead signals an object having a high probability.

Figure 3:
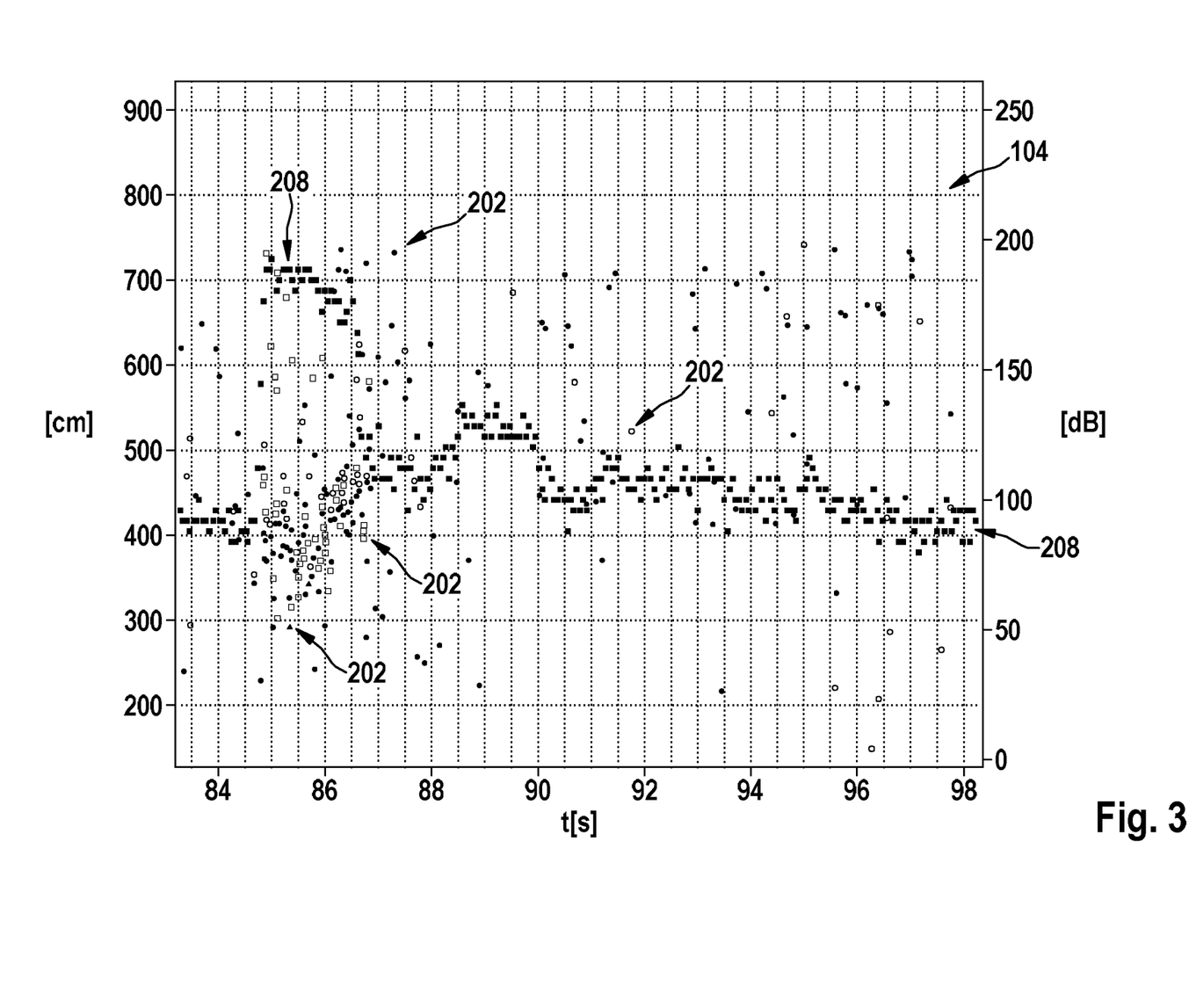
FIG. 3 shows a representation of data packets of an ultrasonic sensor from a large number of measuring time periods.

FIG. 3 shows a representation of data packets 104 of an ultrasonic sensor from a large number of measuring time periods. A data packet 104 represents a measuring time period in each case, as illustrated, for example, in FIG. 2. Excitations 202 detected within a measuring time period are illustrated in columns of a diagram, which has a progressing time in seconds (s) plotted on the abscissa and a distance in centimeters (cm) plotted on the ordinate. A distance value of an excitation 202 corresponds to the time value within the particular measuring time period. A gray value of excitation 202 corresponds to the intensity value of excitation 202.

In addition, a volume of ambient noise 208 in the measuring time periods is plotted on the ordinate. Ambient noise 208 is plotted in decibels (dB).

In heavy rain, in particular, it is interesting to know the exact size of the precipitation quantity, because the prediction of suddenly flooded roads and thus aquaplaning may be made more reliable with the aid of this information.

In accordance with example embodiments of the present invention, the control unit evaluates the background noise caused by the raindrops to calculate the exact precipitation quantity therefrom. This may take place simultaneously or alternately for the object detection with the aid of echo positioning and/or for a moisture detection, using the ultrasonic sensors.

The raindrops cause a suddenly occurring and quickly decaying sound at the level of the natural frequency of the sensor. The larger the drop, and the greater the impact velocity of the drop on the sensor, the greater is the measured sound intensity and reverberation time of the excitation. The measured intensity or reverberation time is corrected to calculate the drop size with the aid of the measured vehicle velocity (wheel speed sensors) and wind velocity (fan wheel). The control unit counts how many raindrops of which size were measured within which time and calculates the exact precipitation quantity therefrom. Since oncoming and preceding vehicles may also influence the drops striking the sensor, for example due to spray, in particular measurements are evaluated, in which no oncoming and preceding vehicles were detected in the surroundings (ultrasonic echo positioning, radar, video or LIDAR).

In other words, FIG. 3 shows measurements of the frontal lateral sensor while driving through an aquaplane pool at vehicle velocities between 30 km/h and 100 km/h.

Noise level 208 increases during the drive through the aquaplane pool, which is why FP objects are increasingly detectable at this time. During the further progression, noise level 208 and the number of FP objects decrease again.

A sample calculation takes place assuming a sensor diameter of two cm or a sensor surface of 314.16 $mm^2$ and a measuring window of 70 ms. At a falling velocity of six m/s, a wind velocity of zero km/h, a vehicle velocity of 50 km/h or 13.89 m/s, a drop diameter of one mm or a volume of 0.52 $mm^3$, a drop strikes the sensor at 15.13 m/s or with an impact energy of 50.5 mJ.

If there are two millimeters of precipitation within 600 seconds, 1,061 drops are present within one cubic meter of air. 4.63 drops strike a sensor every second or one drop every 0.216 seconds. Taking into account the measuring window of 0.07 seconds, one drop is registered in 32.4% of all measurements. If there are four sensors, even one drop strikes one of the four sensors every 0.054 seconds.

In a heavy to very heavy shower (8 mm/10 min), 130% of the measurements are affected by the striking of raindrops, and thus two drops strike the sensor during a measuring window in more than 30% of the measurements, these events nevertheless being measurable separately from each other. In a moderate to heavy shower (2 mm/10 min), 32.4% of all measurements are affected, as illustrated. In a light to moderate shower (0.4 mm/10 min), 6.4% of all measurements are still affected, which corresponds to a drop measurement every 0.27 seconds when using four forward-directed sensors.

At twice the vehicle velocity, approximately twice as many drops strike the sensor surface, quadrupling the impact energy of the drops.

The precipitation quantity may be detected quantitatively and very accurately over a very large measuring range. Even short-term precipitation changes may be accurately detected. The robustness of the warning against aquaplaning increases.

The autonomous drive does not have to be terminated due to heavy rain if the rain quantity and aquaplaning due to suddenly flooded roads may be reliably ruled out with the aid of ultrasound.

More accurate precipitation measurements may be taken in smaller areas and made available to the weather service. With the aid of this data, the weather service is able to at least temporarily forecast better local weather conditions, such as summer storms. A better forecasting of local flooding is made possible.

The ultrasonic systems, which are already installed for parking pilots in a great many cases, may be used to detect rain. No additional component costs are incurred. The rain intensity is calculated, and an aquaplaning warning is generated, in part supported by information from the cloud.

Finally, it should be noted that terms such as "having," "including," etc. do not exclude other elements or steps, and terms such as "a" or "one" do not exclude a plurality. Reference numerals in the claims are not to be considered as limitations.

What is claimed is:

1. A method for measuring precipitation, the method comprising the following steps:
   reading in data packets of at least one ultrasonic sensor, wherein excitations detected by the ultrasonic sensor within a measuring time window being mapped in a data packet of the data packets, the excitations being mapped as respective time values, each of the time values representing a detection point in time of the respective excitation;
   detecting excitations of the mapped excitations as drop events, an excitation of the mapped excitations being detected as a drop event brought about by a pulse of an impacting drop when the respective time value of the excitation satisfies at least one characteristic of a drop event; and
   determining a precipitation intensity, using a number of the drop events detected per time unit.

2. The method as recited in claim 1, wherein, in the detection step, the drop event is detected when no excitation having a similar time value is mapped within a data packet that precedes and/or follows the data packet.

3. The method as recited in claim 1, wherein, in the detection step, the drop event is detected when in different data packets, mapping the same measuring time window, of at least two ultrasonic sensors, no excitation having the same time value is mapped.

4. The method as recited in claim 1, wherein, in the detection step, no drop event is detected when, in different data packets of two ultrasonic sensors, two time values of two excitations differ by a time period corresponding to a propagation time of a sound signal between the ultrasonic sensors.

5. The method as recited in claim 1, wherein, in the read-in step, intensity values are also read in, the intensity value representing an amplitude of the excitation, the drop event being detected in the detection step when the intensity value satisfies at least one characteristic of a drop event.

6. The method as recited in claim 1, wherein, in the read-in step, frequency values are also read in, the frequency value representing a frequency of the excitation, the drop event being detected in the detection step when the frequency value satisfies at least one characteristic of a drop event.

7. The method as recited in claim 1, wherein, in the determination step, the precipitation intensity is also determined, using an impact velocity of drops inducing the drop events.

8. The method as recited in claim 7, wherein, in the determination step, the impact velocity is determined, using a vehicle velocity of a vehicle which includes the ultrasonic sensor and/or a wind velocity at the ultrasonic sensor.

9. The method as recited in claim 1, wherein, in the detection step, the drop event is also determined using a reverberation time value of the excitation mapped in the data packet.

10. The method as recited in claim 1, wherein, in the determination step, the drop events are not evaluated when an object is detected in a spray area in front of the ultrasonic sensor.

11. The method as recited in claim 1, further comprising the following step:
providing a piece of precipitation information representing the precipitation intensity and a piece of position information associated with the piece of precipitation information to a higher-level information network.

12. A control unit for measuring precipitation, the control unit configured to:
read in data packets of at least one ultrasonic sensor, wherein excitations detected by the ultrasonic sensor within a measuring time window being mapped in a data packet of the data packets, the excitations being mapped as respective time values, each of the time values representing a detection point in time of the respective excitation;
detect excitations of the mapped excitations as drop events, an excitation of the mapped excitations being detected as a drop event brought about by a pulse of an impacting drop when the respective time value of the excitation satisfies at least one characteristic of a drop event; and
determine a precipitation intensity, using a number of the drop events detected per time unit.

13. A non-transitory machine-readable storage medium on which is stored a computer program for measuring precipitation, the computer program, when executed by a processor, causing the processor to perform the following steps:
reading in data packets of at least one ultrasonic sensor, wherein excitations detected by the ultrasonic sensor within a measuring time window being mapped in a data packet of the data packets, the excitations being mapped as respective time values, each of the time values representing a detection point in time of the respective excitation;
detecting excitations of the mapped excitations as drop events, an excitation of the mapped excitations being detected as a drop event brought about by a pulse of an impacting drop when the respective time value of the excitation satisfies at least one characteristic of a drop event; and
determining a precipitation intensity, using a number of the drop events detected per time unit.

* * * * *